(12) United States Patent
Nanda et al.

(10) Patent No.: US 9,937,428 B2
(45) Date of Patent: Apr. 10, 2018

(54) INTERACTIVE TOY

(71) Applicant: Toymail Inc, New York, NY (US)

(72) Inventors: Gauri Nanda, Brooklyn, NY (US);
Audry Hill, Grosse Pointe Park, MI (US); Robert Gillis, Raynham, MA (US)

(73) Assignee: Toymail Inc., New York, NY (US)

( * ) Notice: Subject to any disclaimer, the term of this patent is extended or adjusted under 35 U.S.C. 154(b) by 0 days.

(21) Appl. No.: 15/023,293

(22) PCT Filed: Sep. 19, 2014

(86) PCT No.: PCT/US2014/056521
§ 371 (c)(1),
(2) Date: Mar. 18, 2016

(87) PCT Pub. No.: WO2015/042376
PCT Pub. Date: Mar. 26, 2015

(65) Prior Publication Data
US 2016/0220913 A1 Aug. 4, 2016

Related U.S. Application Data

(60) Provisional application No. 61/879,704, filed on Sep. 19, 2013.

(51) Int. Cl.
*A63H 3/28* (2006.01)
*A63H 3/00* (2006.01)
(Continued)

(52) U.S. Cl.
CPC ............... *A63H 3/28* (2013.01); *A63H 3/006* (2013.01); *A63H 33/26* (2013.01); *G05B 15/02* (2013.01);
(Continued)

(58) Field of Classification Search
CPC ........ A63H 3/28; A63H 3/36; A63H 2200/00; A63H 3/003
(Continued)

(56) References Cited

U.S. PATENT DOCUMENTS 4,117,605 A * 10/1978 Kurland ................... A63F 9/183
360/132
4,820,236 A * 4/1989 Berliner .................... A63H 3/28
310/311
(Continued)

FOREIGN PATENT DOCUMENTS

CN 202460102 U 10/2012
CN 202478580 U 10/2012
(Continued)

OTHER PUBLICATIONS

PCT/US2014/056521, International Search Report and Written Opinion issued in PCT/US2014/056521 dated Jan. 8, 2015, Jan. 8, 2015.
(Continued)

*Primary Examiner* — Alexander Niconovich
(74) *Attorney, Agent, or Firm* — Foley & Lardner LLP

(57) ABSTRACT

An interactive toy for a child, the interactive toy having a body, a central processing unit (CPU), a wireless communication module, a memory module, a batter module, and a plurality of input/output modules. The body has an ornamental exterior, at least one input button, and a perforated surface section. The CPU includes an imbedded control logic for operating the toy. The wireless communication module is electrically connected for data exchange with the CPU. The memory module is electrically connected for data exchange with the CPU. The battery module is electrically connected to the CPU for providing electrical power. The plurality of input/output modules is electrically connected to (Continued)

the CPU for sending and receiving input signals between the child and the CPU.

18 Claims, 15 Drawing Sheets

(51) Int. Cl.
*A63H 33/26* (2006.01)
*G05B 15/02* (2006.01)
*H04L 29/08* (2006.01)
*H04W 4/14* (2009.01)

(52) U.S. Cl.
CPC .............. *H04L 67/10* (2013.01); *H04W 4/14* (2013.01); *A63H 2200/00* (2013.01)

(58) Field of Classification Search
USPC ....... 446/175, 268, 297, 298, 302, 369, 397, 446/484
See application file for complete search history.

(56) References Cited

U.S. PATENT DOCUMENTS

| | | | | |
|---|---|---|---|---|
| 4,840,602 A * | 6/1989 | Rose | ........................ | A63H 3/28 273/460 |
| 4,973,052 A * | 11/1990 | Conti | ........................ | A63F 9/00 273/444 |
| 5,471,192 A * | 11/1995 | Dash | ........................ | A63H 3/28 340/384.3 |
| 5,746,602 A * | 5/1998 | Kikinis | .................... | A63H 3/48 369/30.02 |
| 5,944,533 A * | 8/1999 | Wood | ....................... | A63H 3/28 434/167 |
| 6,012,961 A * | 1/2000 | Sharpe | ..................... | A63H 3/28 446/175 |
| 6,196,893 B1 * | 3/2001 | Casola | ..................... | A63H 3/28 446/297 |
| 6,558,225 B1 * | 5/2003 | Rehkemper | ............ | A63H 3/003 40/448 |
| 7,018,265 B2 * | 3/2006 | Ghaly | ....................... | A63H 3/28 446/175 |
| 8,433,579 B1 * | 4/2013 | Duran | .................. | H04N 5/4403 446/436 |
| 8,467,722 B2 * | 6/2013 | Spector | .................. | H04R 27/00 455/3.06 |
| 8,574,024 B2 * | 11/2013 | Amireh | ................... | A63H 30/04 446/454 |
| 9,327,094 B2 * | 5/2016 | Patel | ...................... | A61M 21/02 |
| 9,527,001 B2 * | 12/2016 | Richardson | ............ | A63H 33/26 |
| 9,770,651 B2 * | 9/2017 | Olson | .................... | A63F 13/235 |
| 2003/0130851 A1 * | 7/2003 | Nakakita | .................. | A63H 3/28 704/275 |
| 2006/0228982 A1 * | 10/2006 | Rehkemper | .............. | A63H 3/28 446/279 |
| 2008/0159558 A1 * | 7/2008 | Lan | ........................ | H04R 1/345 381/91 |
| 2008/0194175 A1 * | 8/2008 | Last | ........................ | A63H 3/28 446/302 |
| 2009/0156089 A1 * | 6/2009 | Hoard | .................... | A63H 3/001 446/297 |
| 2009/0209170 A1 * | 8/2009 | Richter | .................... | A63H 3/28 446/297 |
| 2010/0041304 A1 * | 2/2010 | Eisenson | .................. | A63H 3/28 446/297 |
| 2010/0167623 A1 * | 7/2010 | Eyzaguirre | ............... | A63H 3/28 446/330 |
| 2012/0185254 A1 * | 7/2012 | Biehler | .................. | H04L 67/125 704/270 |
| 2012/0295510 A1 * | 11/2012 | Boeckle | .................... | A63H 3/28 446/72 |
| 2014/0256214 A1 * | 9/2014 | Ramamoorthy | ......... | A63H 3/28 446/297 |
| 2017/0072329 A1 * | 3/2017 | Akavia | ............... | H04M 1/7253 |

FOREIGN PATENT DOCUMENTS

| | | |
|---|---|---|
| KR | 100943651 B1 | 2/2010 |
| WO | 2001012285 A1 | 2/2001 |

OTHER PUBLICATIONS

Extended European Search Report dated May 19, 2017 as received in Application No. 14846488.6.

Office Action dated May 18, 2017 as received in CN Application No. 201480051794.2.

* cited by examiner

INTERACTIVE TOY

CROSS-REFERENCE TO RELATED APPLICATIONS

This application is a continuation of U.S. Application No. 61/879,704 filed Sep. 19, 2013. The disclosure of the above application is incorporated herein by reference.

FIELD

The present disclosure relates to a child's toy, and more specifically to a child's interactive toy capable of two-way communication between the toy and a remote communication device operated by a second user.

BACKGROUND

The statements in this section merely provide background information related to the present disclosure and may or may not constitute prior art.

A typical toy capable of receiving a first user or child's input and providing audio output generally has a series of imbedded audio messages that are not changeable or updatable. The toy has to be reprogrammed with new imbedded messages by manipulation of the toy by a second user or parent.

While current toys achieve their intended purposes there is a need for a new interactive toy that can be remotely updated with new audio output and provide a true interactive experience between the child, the parent, and the toy.

SUMMARY

The present invention provides an interactive toy. The interactive toy includes a body, a central processing unit (CPU), a wireless communication module, a battery module, and a plurality of input/output modules. The body has an ornamental exterior, at least one input button, and a perforated surface section. The central processing unit CPU is disposed within the body. The CPU includes an imbedded control logic for operating the toy. The wireless communication module is in communication with the CPU. The memory module is in communication with the CPU. The battery module is in communication with the CPU for providing electrical power. The plurality of input/output modules is in communication with the CPU for sending and receiving input signals between the child and the CPU.

In another example of the present invention, the wireless communication module is at least one of a Wifi connectivity communication unit, a cellular communication unit having a SIM card, a Bluetooth® communication unit, and a satellite direct communication unit.

In yet another example of the present invention, the memory module is at least one of a chip-based memory module such as a flash memory and a mechanical based memory module such as a hard drive.

In yet another example of the present invention, the battery module includes a battery monitor in communication with the CPU and at least one of a rechargeable battery and a one-time use battery.

In yet another example of the present invention, the plurality of input/output modules include at least one input button, an audio input module, an audio output module, light emitting devices, a vibration module, and a movement detection module.

In yet another example of the present invention, the at least one input button includes a play button and a record button disposed on the body of the toy.

In yet another example of the present invention, the audio input module includes a microphone and an amplifier, and wherein the microphone is disposed on the inside of the body of the toy proximate to the perforated surface section.

In yet another example of the present invention, the audio output module includes a speaker and an amplifier, and wherein the speaker is disposed on the inside of the body of the toy proximate to the perforated surface section.

In yet another example of the present invention, wherein the ornamental exterior of the body includes a soft-touch surface and features of a character head having at least a pair of eyes, a nose, and a mouth.

In yet another example of the present invention, the light emitting devices include light emitting diodes (LEDs) are disposed on the exterior of the body in place of the pair of eyes of the character head.

In yet another example of the present invention, the control logic of the CPU includes a first through eighth control logics. The first control logic is for playing a downloaded audio message. The second control logic is for signaling the user to replay the downloaded message. The third control logic is for pausing to allow the user time to press the record button. The fourth control logic is for determining if the record button has been pressed. The fifth control logic is for activating the audio input module to receive voice data from the user if the record button has been pressed. The sixth control logic is for determining if the play button has been pressed if the record button has not been pressed for returning to the first control logic if the CPU determines that the play button has been pressed. The seventh control logic is for indicating a cancellation signal to the user via the audio output module if the play button has not been pressed. The eighth control logic is for pausing the CPU for waiting for input from the user.

In yet another example of the present invention, the control logic of the CPU includes a first through seventh control logics. The first control logic is for erasing any recorded voice data from memory. The second control logic is for signaling the user to begin recording an audio message. The third control logic is for receiving and storing into memory a new audio message. The fourth control logic is for continuing to record or wait for additional audio data input. The fifth control logic is for signaling to the user that the recordation of the audio data has ceased. The sixth control logic is for playing back the recorded audio data. The seventh control logic is for uploading the recorded audio data to the internet or cloud server for retrieval by a second user.

Further features and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figures 1A, 1B, 1C:
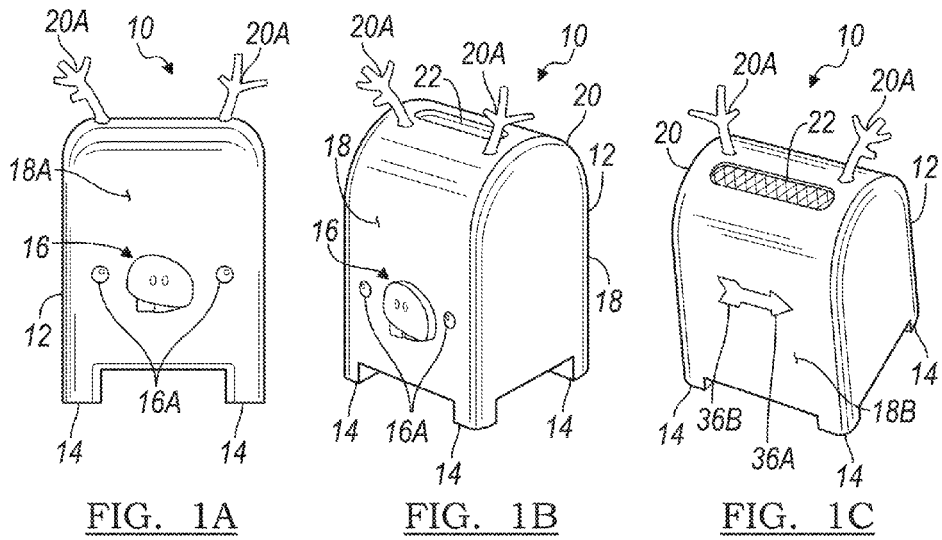
FIG. 1A is a depiction of a frontal view of an interactive toy according to the present disclosure.
FIG. 1B is a depiction of a perspective view of an interactive toy according to the present disclosure.
FIG. 1C is a depiction of a rear perspective view of an interactive toy according to the present disclosure.

With reference to FIGS. 1A-1C, an exemplary embodiment of an interactive child's toy 10 is illustrated and will now be described. The toy 10 includes a body 12 having legs 14 and ornamental exterior 16. For example, the body 12 of the toy 10 has a soft-touch exterior surface and includes a cubic main portion 18 and a partially cylindrical top portion 20. The legs 14 extend from four bottom corners of the cubic main portion 18 of the body 12. The ornamental exterior includes the face of an animal disposed on a front side 18A of the cubic main portion 18 of the body 12 and includes a plurality of light emitting devices 16A that may take the form of a pair of eyes of the face. Additional accessories, antlers 20A for example, may be disposed on the top portion 20 of the body 12. The toy also includes a perforated surface or grate 22 and a plurality of buttons, keys, or other pressure-sensitive type actuators 24. The perforated grate 22 is disposed on a surface of the top portion 20 of the body 12. The plurality of buttons 24 are disposed on a surface of the rear side 18B of the cubic main portion 18 of the body 12, however, the plurality of buttons 24 may also be disposed elsewhere on the surface of the toy without departing from the scope of the invention.

Figure 2:
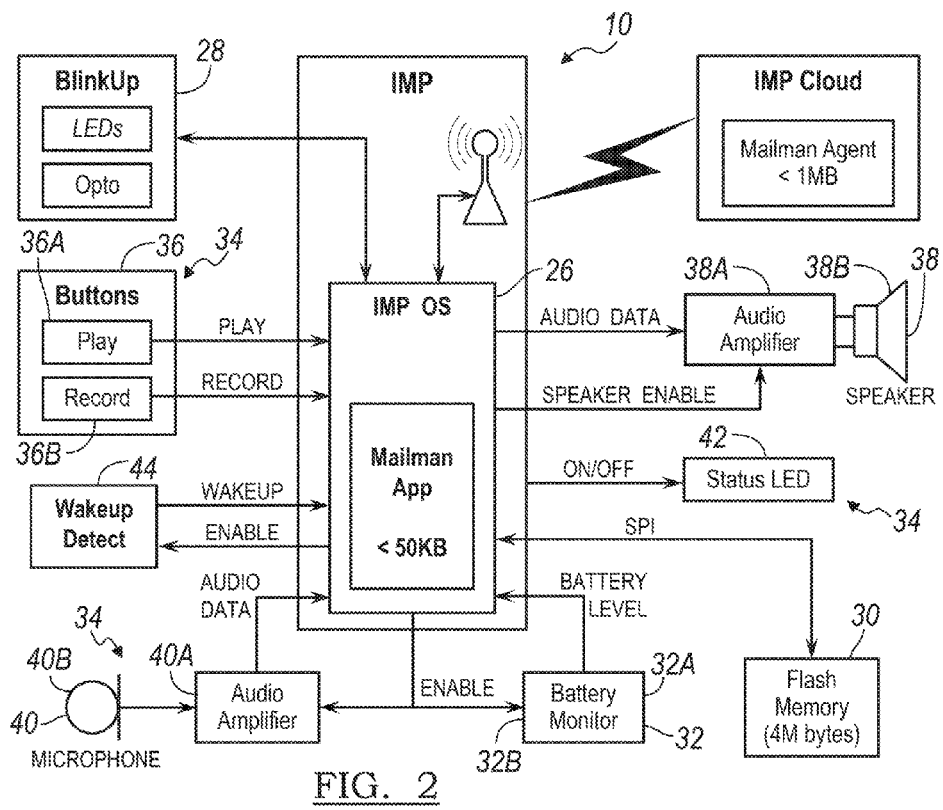
FIG. 2 is a schematic diagram of an interactive toy according to the present disclosure.

Turning now to FIG. 2 with continued reference to FIGS. 1A-1C, an exemplary schematic of an interactive child's toy 10 is illustrated and will now be described. The interactive toy 10 includes a central processing unit (CPU) 26, a wireless communication module 28, a memory module 30, a battery module 32, and a plurality of input/output modules 34. The CPU 26, communication module 28, memory module 30, battery 32, and some of the plurality of input/output modules 34 are contained in the body 12 of the toy 10. For example, the CPU 26 is connected for data exchange with the communication module 28 and the memory module 30 while utilizing the battery 32 for power and receiving and sending input and output signals to the plurality of input/output modules 34.

The wireless communication module 28 includes one or more of a number of wireless communication technologies without departing from the scope of the invention. For example, Wifi technology may be used to allow the CPU 26 to communicate with a router and connect to the internet. Also, the wireless communication module 28 may use cellular technology, using a subscriber identification module (SIM), to communicate via a cellular data network. Other technologies that may be used are Bluetooth® and satellite wireless communications technologies or a combination of these technologies. The communications module also includes a signal output mechanism 28A and an opto-isolator or optocoupler 28B. The signal output mechanism provides the current status of the communication signal. The signal mechanism 28A may be in the form of light emitting diode (LED) device or the like. The optocoupler 28B is a visual data link that prevents high voltages from affecting the CPU 26.

The memory module 32 includes a form of data storage such as flash memory or a mechanical type of memory storage and sends and receives data to and from the CPU 26.

The plurality of input/output modules 34 includes user input buttons 36, an audio output module 38, an audio input module 40, status LEDs 42, a vibration module, and a wakeup detection module 44. The input buttons 36 include a play button 36A and a record button 36B which send user input signals to the CPU and communicates with the wakeup detection module 44. In another example of the present invention, the input buttons 36 may be replaced by a voice activated input module to allow the user to use voice command or prompts for commanding the toy 10. Referring also to FIG. 1C, the input buttons 36 are shown as the plurality of buttons, keys, or other pressure-sensitive type actuators 24 on the rear face 18B of the body 12 of the toy 10. The audio output module 38 includes an audio amplifier 38A which receives audio data from and is enabled by the CPU 26 and an audio speaker 38B. The audio speaker 38B is disposed inside the body 12 of the toy 10 adjacent to the perforated grate 22. The audio input module 40 includes an audio amplifier 40A which sends audio data to and is enabled by the CPU 26 and a microphone 40B. The microphone 40A is also disposed inside the body 12 of the toy 10 adjacent to the perforated grate 22.

The battery module 32 includes a rechargeable or one-time use battery 32A and a battery monitor 32B. The battery 32A sends power to the CPU 26 while the battery monitor 32B sends a charge status signal to the CPU 26. The battery module 32 also receives an enable signal from the CPU 26.

The CPU 26 generally includes an electronic control device having a preprogrammed digital computer or processor, an operating system, control logic, memory used to store data, and at least one I/O peripheral. The control logic includes a plurality of logic routines for monitoring, manipulating, and generating data. The control logic may be implemented in hardware, software, or a combination of hardware and software. For example, control logic may be in the form of program code that is stored on the memory module 32 or in the memory of the CPU 26 and executable by the CPU 26. As stated above, the CPU 26 receives data input from the wireless communication module 28, the memory module 30, the battery module 32, the input buttons 36, and the audio input module 40 while providing several outputs to the audio output module 38 and the LEDs 28, 42.

In another example of the present invention, an interactive child's toy communication system includes the toy 10, an agent, a Toymail application, and a backend server and is used by a first and a second user. The toy 10, as described above, includes a CPU in the form of an Electric Imp® device, however other forms or types of processors may be used without departing from the scope of the invention. The agent is an Imp Cloud® service or other type of cloud data sharing and storage. The Toymail application is an iPhone®App or an Android® based phone app that one of the users installs on their phone and uses to send text or voice messages to the toy 10. The backend server is a web based server that interfaces with the toy 10 and the Toymail application. The first and second user, for example, may be a child and his/her parent or grandparent.

Figure 3:
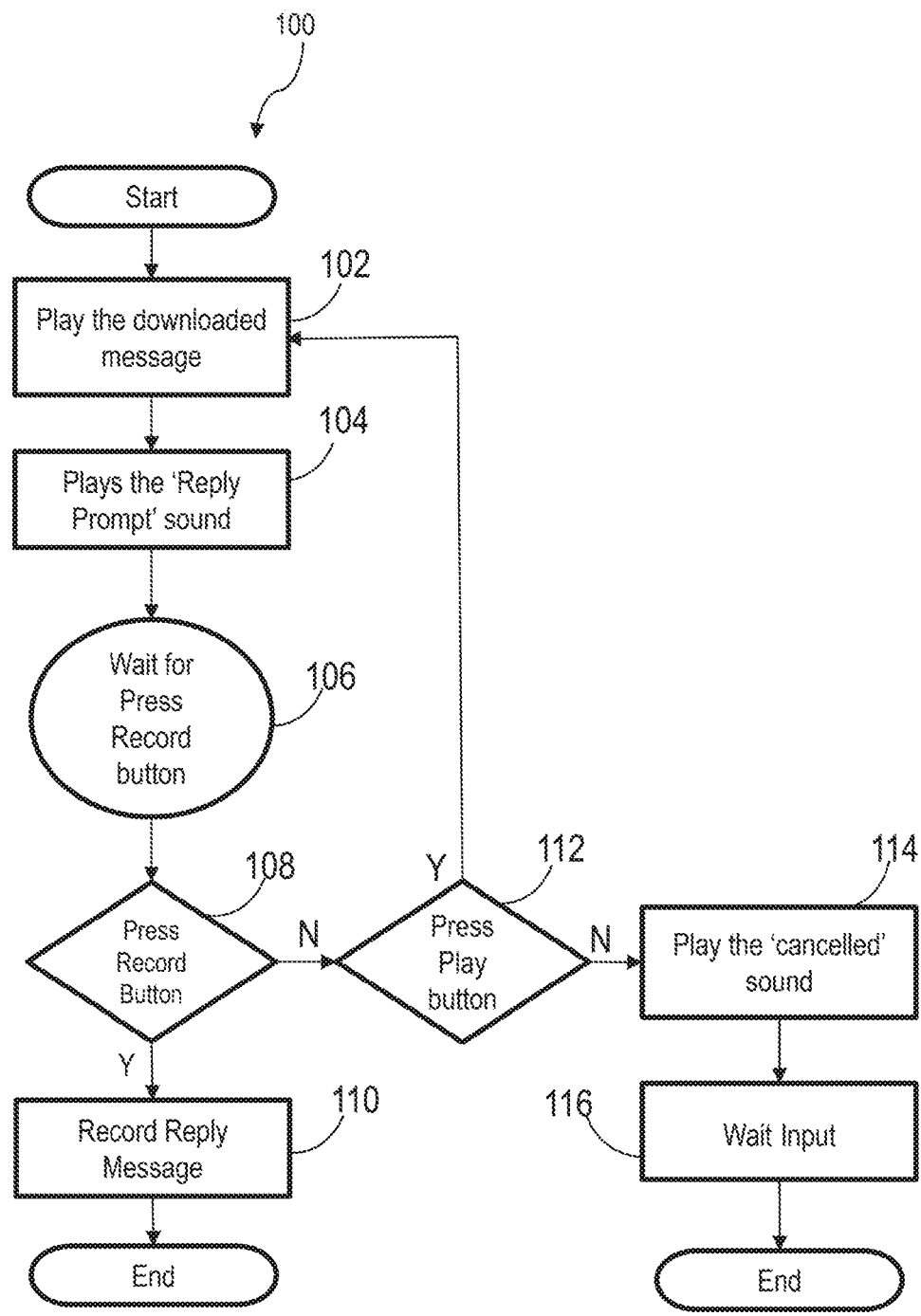
FIG. 3 is a flowchart of a method or control logic executed by an interactive toy according to the present disclosure.

An example of a control logic or method 100, shown in flowchart form in FIG. 3, is implemented in software program code that is executable by the CPU 26 and includes a first control logic 102 for playing a downloaded audio message. A second control logic 104 signals the user to replay the downloaded message. A third control logic 106 pauses to allow the user time to press the record button 36B. A fourth control logic 108 determines if the record button 36B has been pressed. A fifth control logic 110 activates the audio input module 40 to receive voice data from the user if the record button 36B has been pressed. A sixth control logic 112 determines if the play button has been pressed 36A if the record button 36B has not been pressed. The control logic 100 returns to the first control logic 102 if the CPU determines that the play button 36B has been pressed. A seventh control logic 114 indicates a cancellation to the user via the audio output module 38 if the play button 36B has not been pressed. An eighth control logic 116 pauses the CPU to await input from the user.

Figure 4:
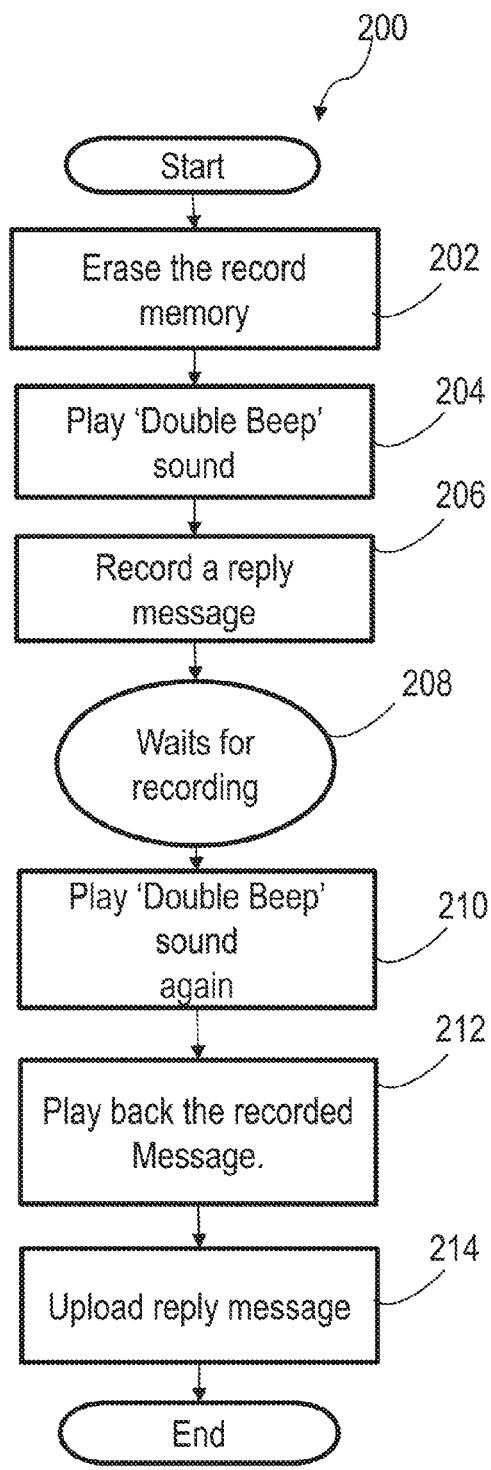
FIG. 4 is a flowchart of a method or control logic executed by an interactive toy according to the present disclosure.

Another exemplary control logic or method 200 is shown in flowchart form in FIG. 4 and is implemented in software program code that is executable by the CPU 26 and includes a first control logic 202 for erasing any recorded voice data from memory. A second control logic 204 signals the user to begin recording an audio message. A third control logic 206 receives and places into memory a new audio message. A fourth control logic 208 continues to record or waits for additional audio data input. A fifth control logic 210 signals to the user that the recordation of the audio data has ceased. A sixth control logic 212 plays back the recorded audio data. A seventh control logic 214 uploads the recorded audio data to the internet or cloud server for retrieval by a second user.

Figure 5:
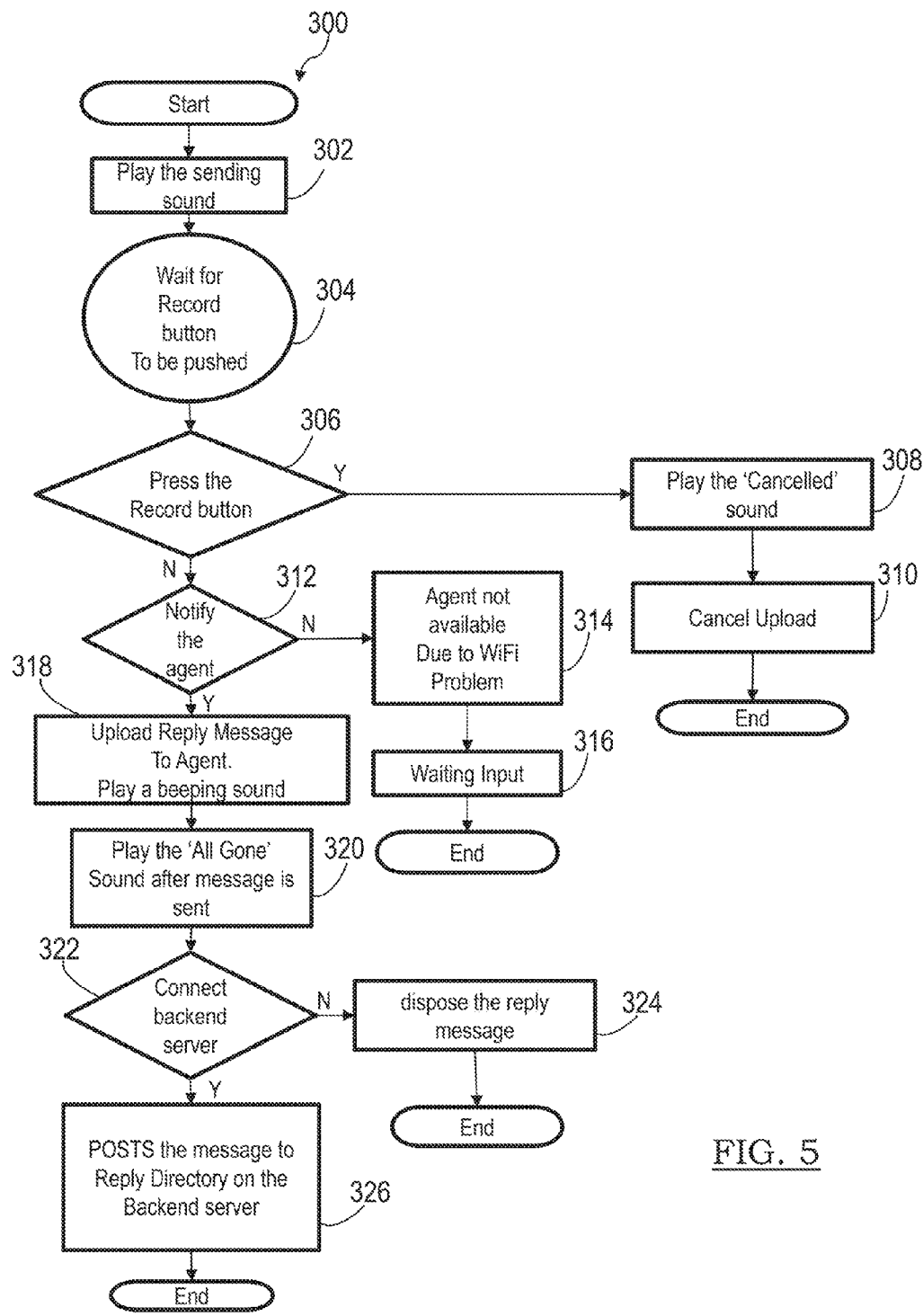
FIG. 5 is a flowchart of a method or control logic executed by an interactive toy according to the present disclosure.

Yet another exemplary control logic or method 300 is shown in flowchart form in FIG. 5 and is implemented in software program code that is executable by the CPU 26 and includes a first control logic 302 indicates to the user that a message is being uploaded to the agent. A second control logic 304 pauses the toy 10 and waits for the record button 36B to be pressed by the user. A third control logic 306 determines if the record button 36B was pressed. A fourth control logic 308 indicates to the user that the upload is going to be cancelled since the user pressed the record button 36B. A fifth control logic 310 cancels the message upload by the toy 10. A sixth control logic 312 notifies the agent that a message is ready to be uploaded after the user did not press the record button 36B. A seventh control logic 314 places the toy 10 into a waiting for input mode after the toy 10 is unable to notify the agent that there is a message available for uploading due to a connectivity problem. An eighth control logic 318 uploads the recorded message to the agent if the agent is available. A ninth control logic 320 for providing the user with an indicator that the message has been uploaded. A tenth control logic 322 attempts to connect the toy to the backend server. An eleventh control logic 324 disposes the reply message. A twelfth control logic 326 posts the message to a reply directory on the backend server.

Figure 6A:
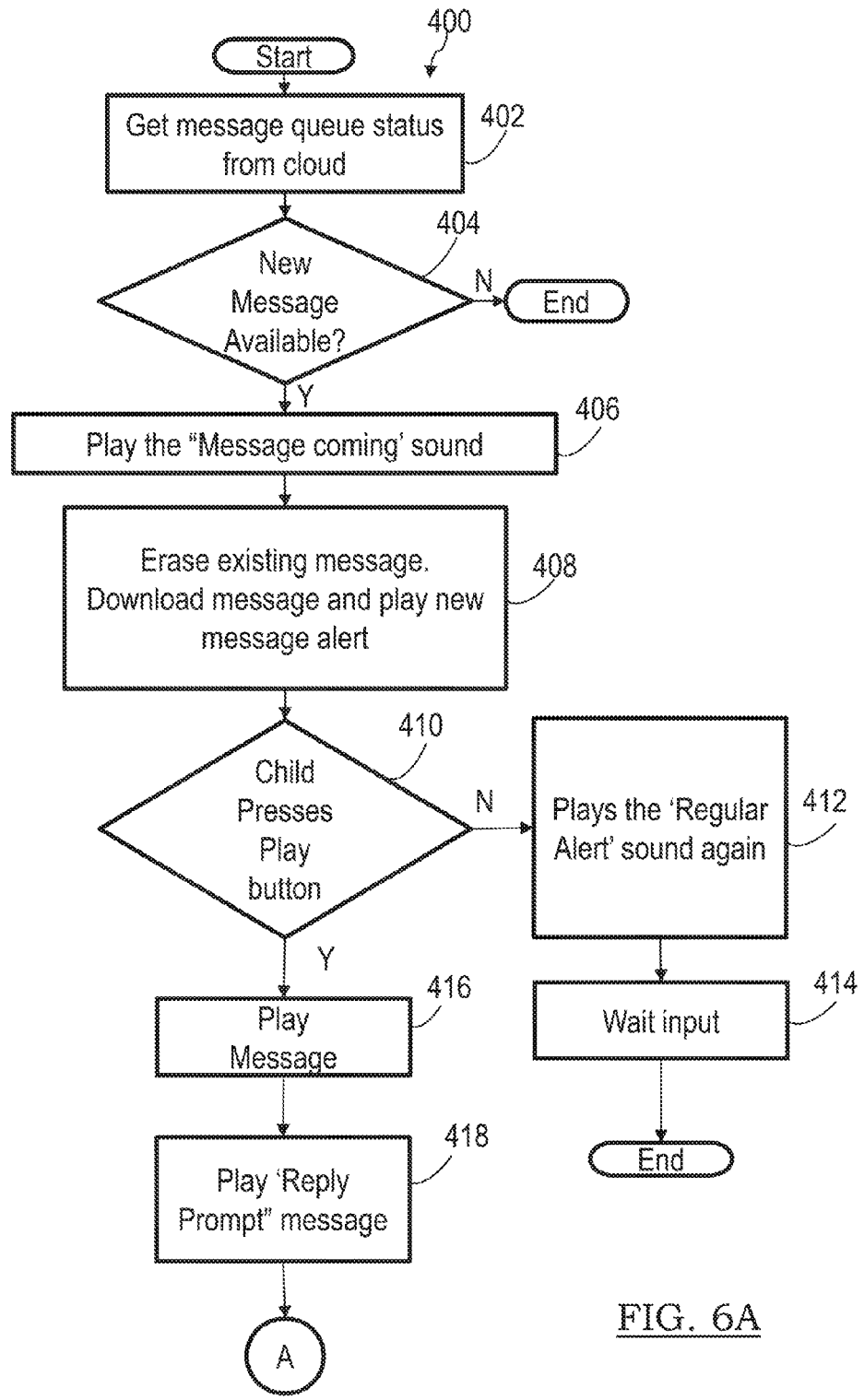
FIG. 6A is a flowchart of a method or control logic executed by an interactive toy according to the present disclosure.
Figure 6B:
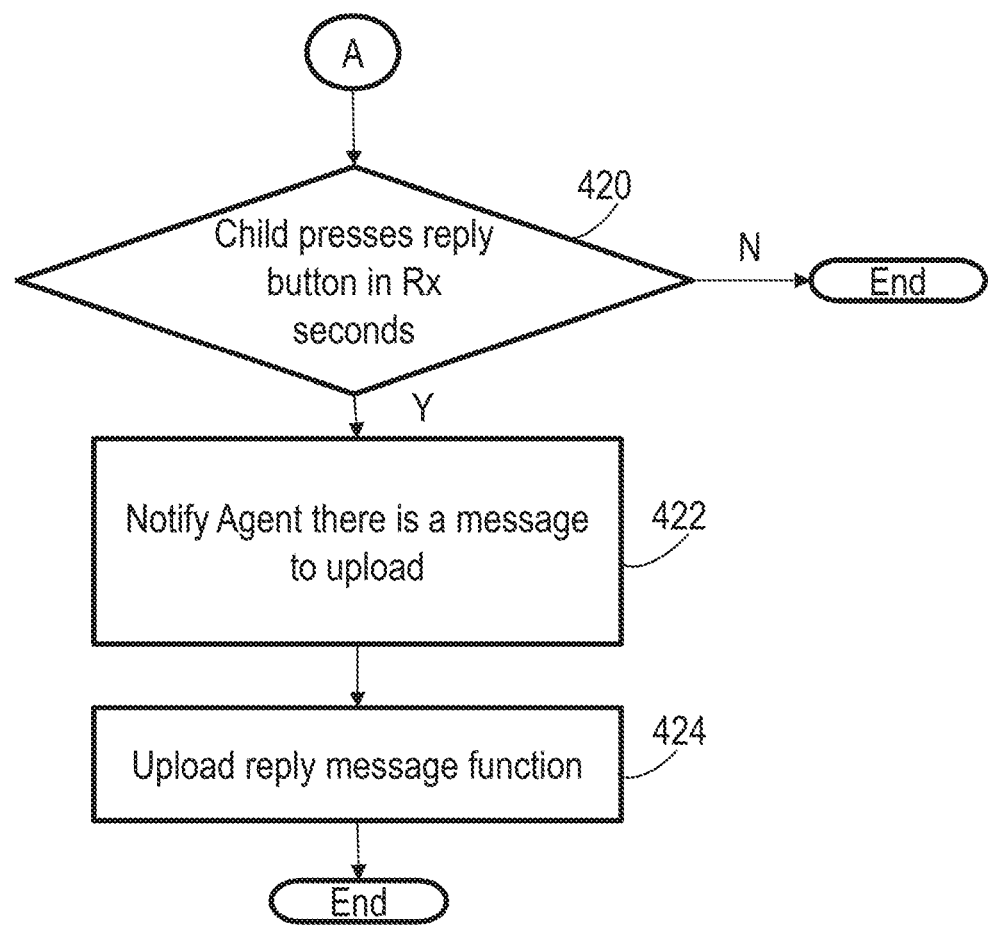
FIG. 6B is a flowchart of a method or control logic executed by an interactive toy according to the present disclosure.

Yet another exemplary control logic or method 400 is shown in flowchart form in FIGS. 6A and 6B and is implemented in software program code that is executable by the CPU 26 and includes a first control logic 402 for retrieving a message queue status from the Imp Cloud®. A second control logic 404 determines if there is a new message available for download. A third control logic 406 indicates to the user that a new message is being downloaded. A fourth control logic 408 erases the existing message, downloads the new message, and indicates to the user that there is a new message waiting to be played. A fifth control logic 410 determines if the user has pressed the play button 36A. A sixth control logic 412 indicates to the user that there is still a new message if the user did not press the play button 36A. A seventh control logic 414 places the toy in a wait for input mode. An eighth control logic 416 plays the message if the user pressed the play button 36A. A ninth control logic 418 provides the user with an indicator that the toy 10 is waiting for the user to record a reply message. A tenth control logic 420 determines if the user has pressed the record button 36B. An eleventh control logic 422 notifies the agent that there is a reply message to upload. A twelfth control logic 424 uploads the reply message to the agent.

Figure 7A:
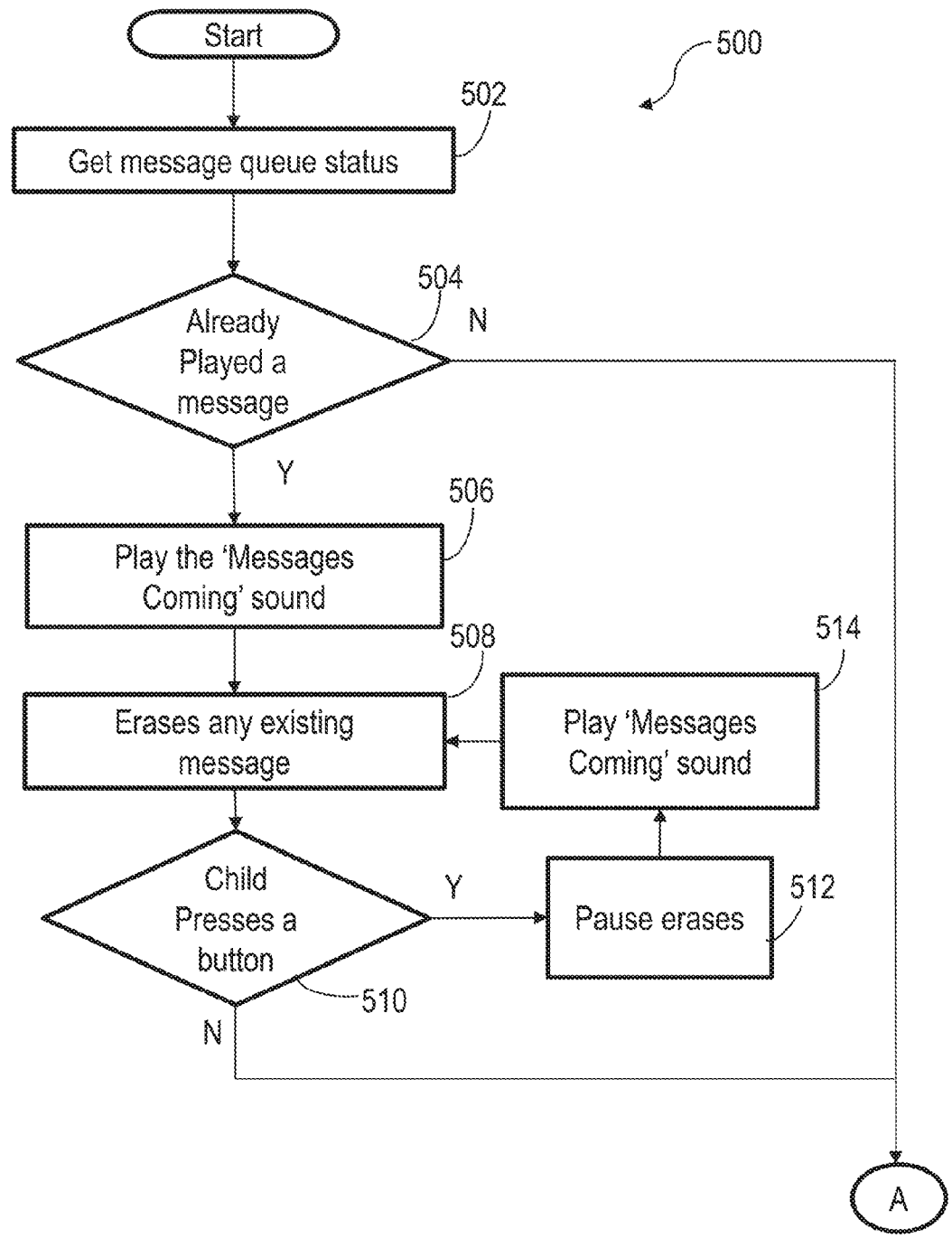
FIG. 7A is a flowchart of a method or control logic executed by an interactive toy according to the present disclosure.
Figure 7B:
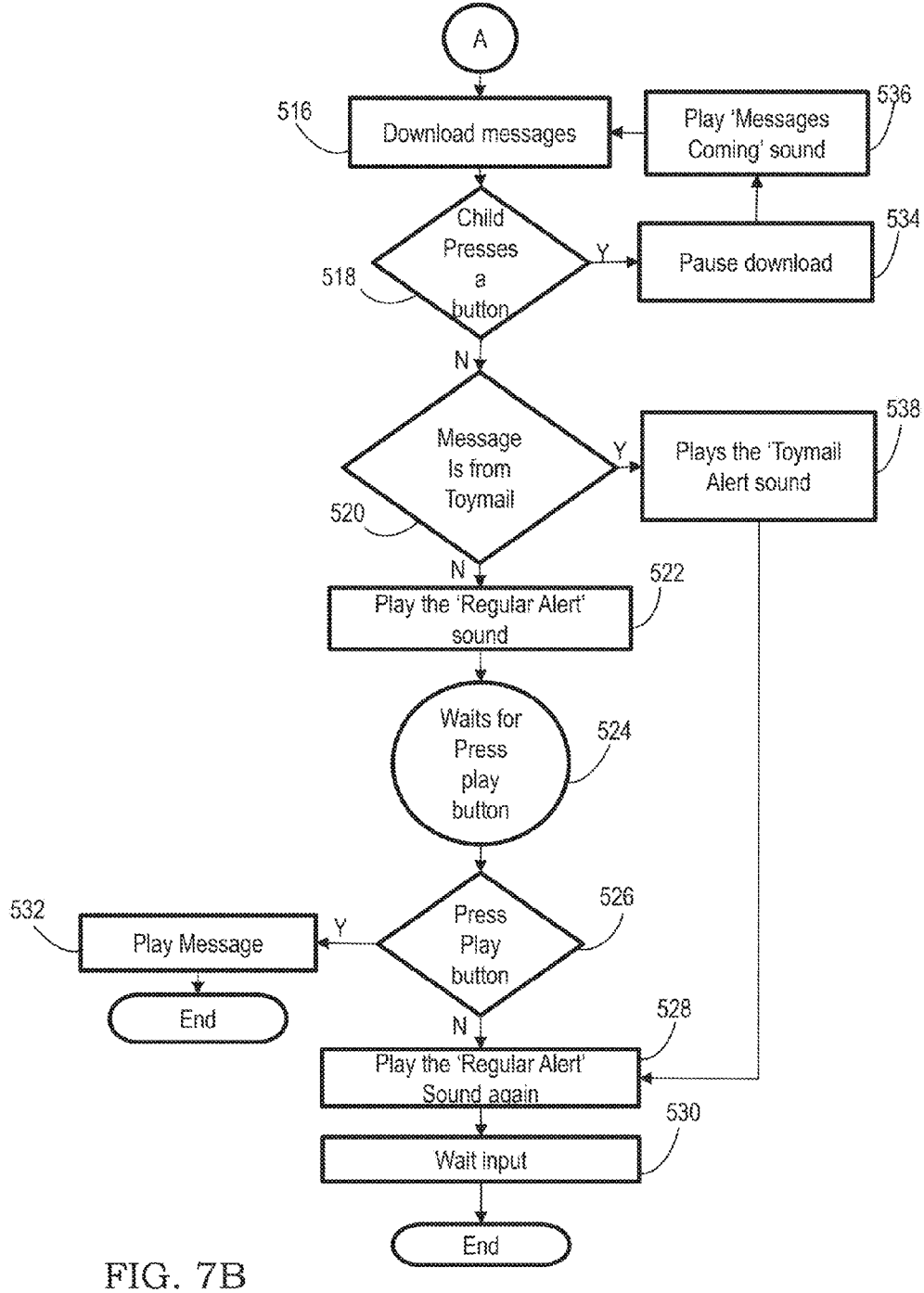
FIG. 7B is a flowchart of a method or control logic executed by an interactive toy according to the present disclosure.

Yet another exemplary control logic or method 500 is shown in flowchart form in FIGS. 7A and 7B and is implemented in software program code that is executable by the CPU 26 for downloading a message and includes a first control logic 502 for retrieving a message queue status from the Imp Cloud®. A second control logic 504 determines if there is a new message available for download. A third control logic 506 indicates to the user that a new message is being downloaded. A fourth control logic 508 erases the existing message. A fifth control logic 510 determines if the user has pressed a button 36. A sixth control logic 512 pauses the erasure of the existing message if the user pressed a button 36. A seventh control logic 514 indicates to the user that a new message is being downloaded and continues to the fourth control logic 508. An eighth control logic 516 downloads the message if the user did not press the button 36. A ninth control logic 518 determines if the user has pressed a button 36. A tenth control logic 520 determines if the message is from Toymail if the user did not press the button 36. An eleventh control logic 522 indicates to the user that the message is not from Toymail. A twelfth control logic 524 pauses to wait for the user to press the play button 36A. A thirteenth control logic 526 determines if the user pressed the play button 36A. A fourteenth control logic 528 indicates to the user that there is a new message awaiting playback if the user did not press the play button 36A. A fifteenth control logic 530 places the toy 10 in a wait for input mode. A sixteenth control logic 534 pauses the message download if the user presses a button 36. A seventeenth control logic 53 indicates to the user that a new message was being downloaded and returning to the eighth control logic 516. An eighteenth control logic 538 indicates to the user that the new message is a Toymail message and continuing to the fourteenth control logic 528.

Figure 8:
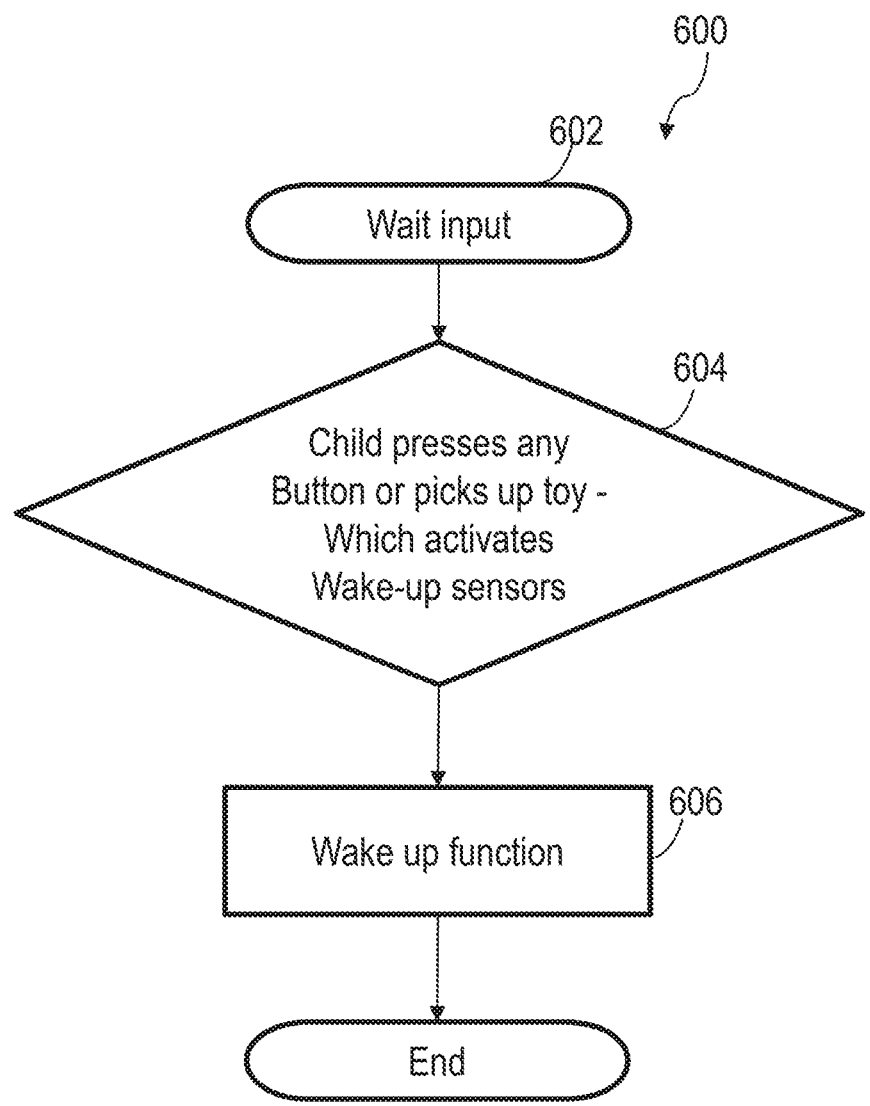
FIG. 8 is a flowchart of a method or control logic executed by an interactive toy according to the present disclosure.

Yet another exemplary control logic or method 600 is shown in flowchart form in FIG. 8 and is implemented in software program code that is executable by the CPU 26 for placing the toy 10 into a wait mode and includes a first control logic 602 for waiting for input. A second control logic 604 determines if there has been any input from the user by pushing a button 36 or by moving the toy 10 as detected by the wakeup detect module 44. A third control logic 606 continues on to a "Wakeup Toy" use case as detailed below.

Figure 9:
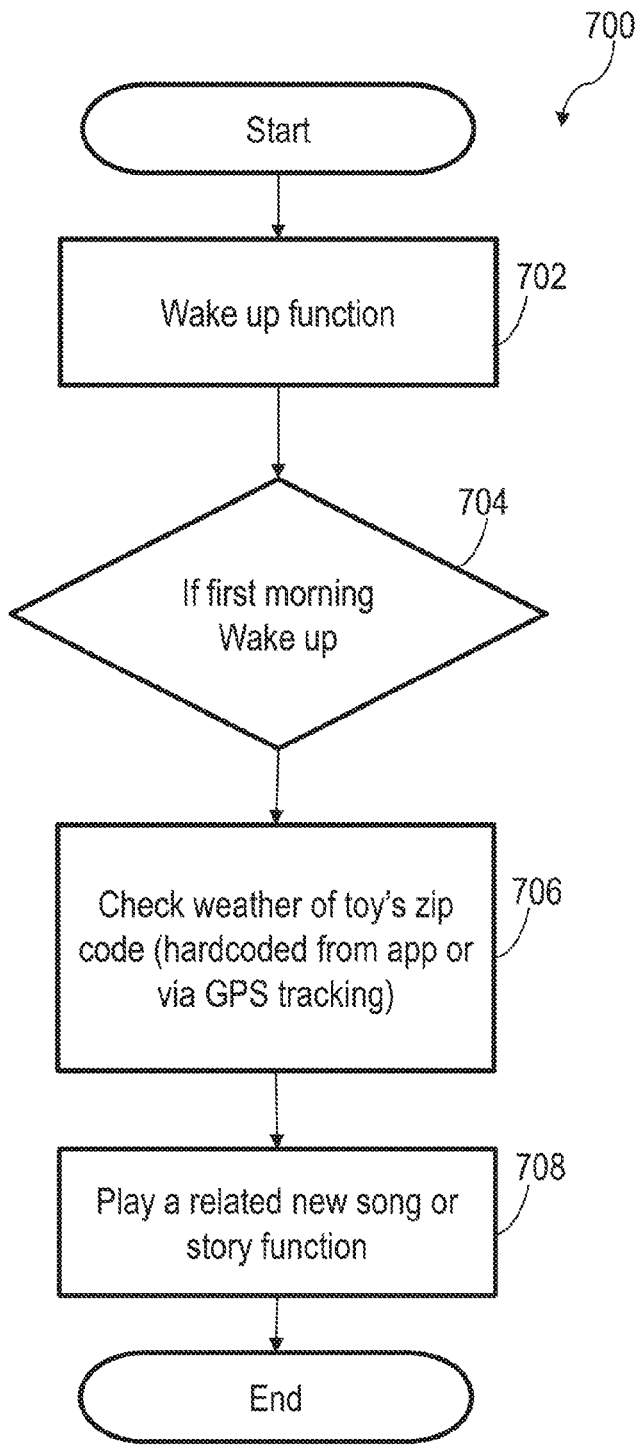
FIG. 9 is a flowchart of a method or control logic executed by an interactive toy according to the present disclosure.

Yet another exemplary control logic or method 700 is shown in flowchart form in FIG. 9 and is implemented in software program code that is executable by the CPU 26 for executing a contextual song and story and includes a first control logic 702 for executing the "Wakeup Toy" use case as described below. A second control logic 704 determines if the current toy wakeup is the first time the toy is waking up in the morning. A third control logic 706 retrieves weather data via the agent or Imp Cloud®. A fourth control logic 708 selects and plays a song or a story relating to the retrieved weather data.

Figure 10A:
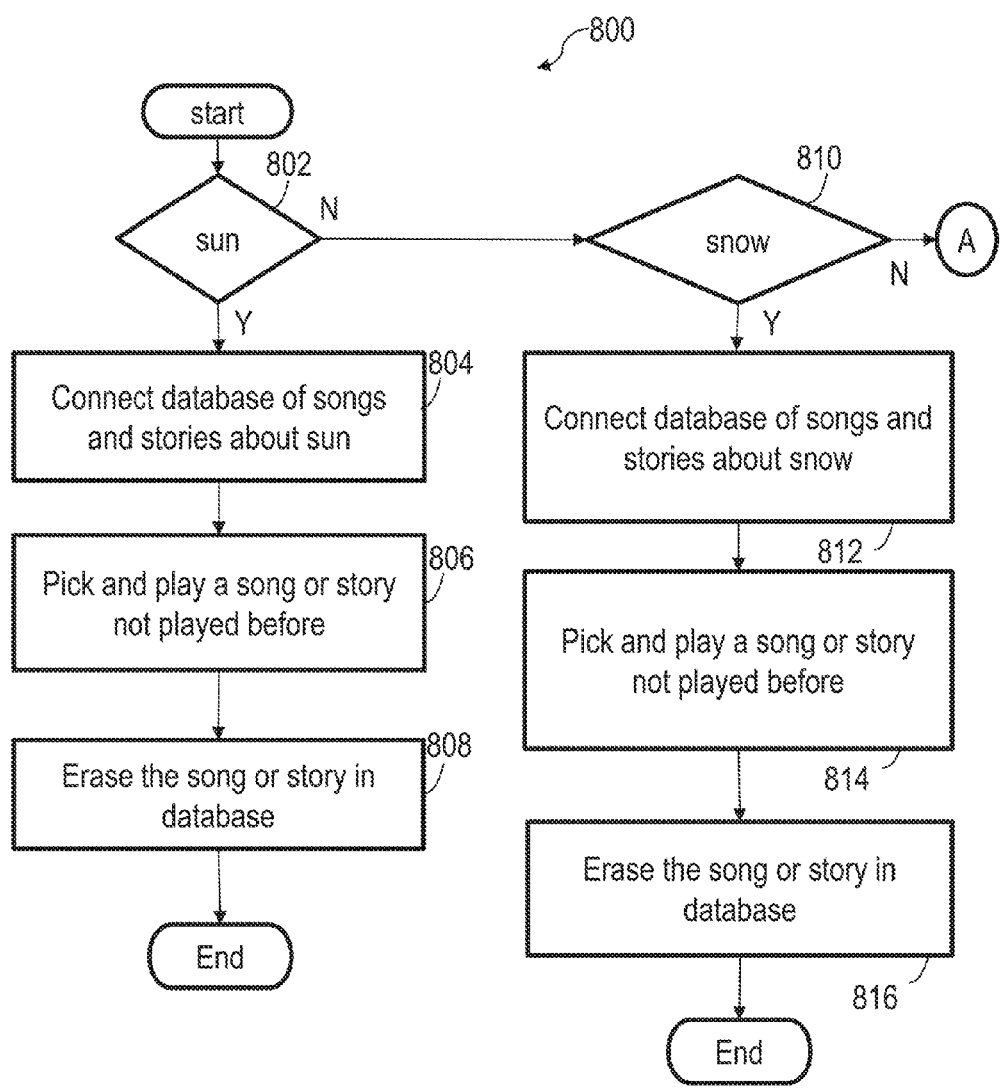
FIG. 10A is a flowchart of a method or control logic executed by an interactive toy according to the present disclosure.
Figure 10B:
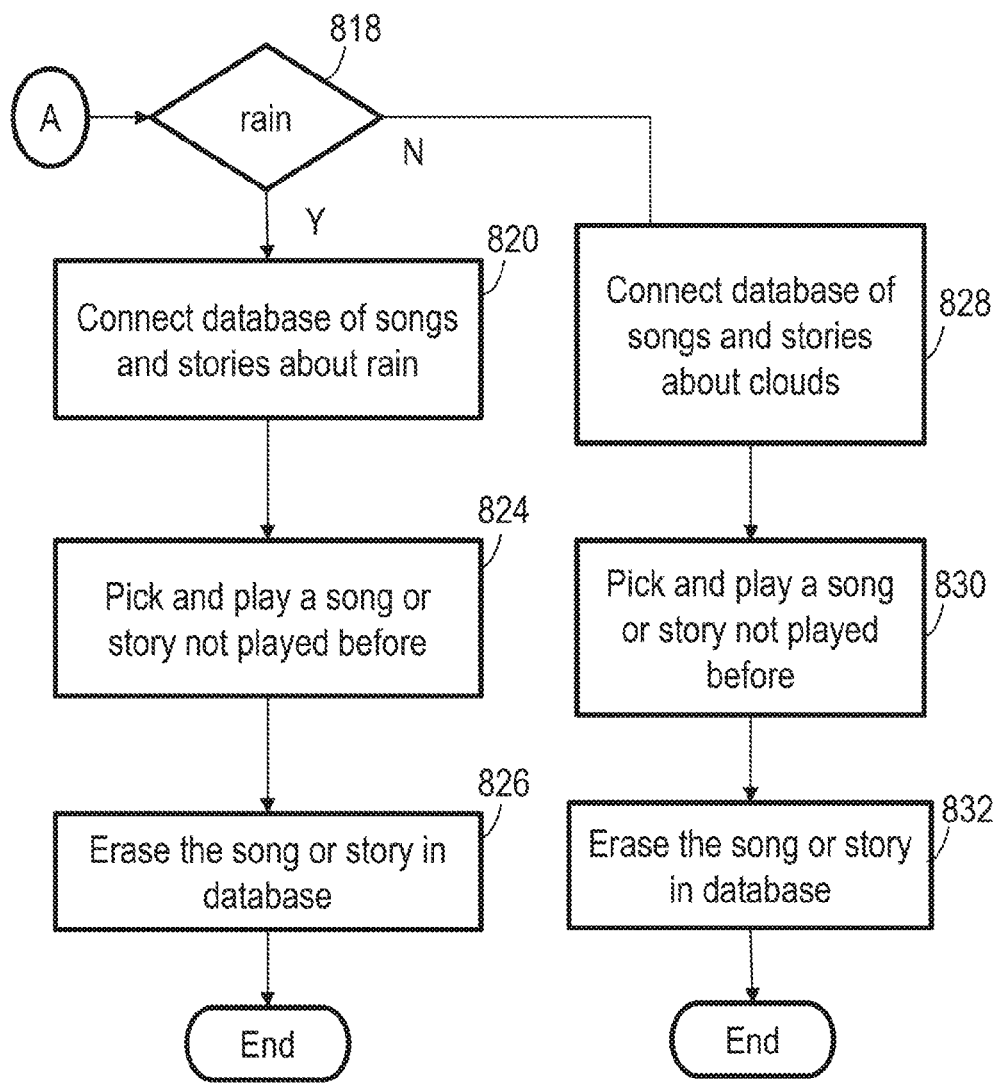
FIG. 10B is a flowchart of a method or control logic executed by an interactive toy according to the present disclosure.

Yet another exemplary control logic or method 800 is shown in flowchart form in FIGS. 10A and 10B and is implemented in software program code that is executable by the CPU 26 for executing a weather contextual song and story and includes a first control logic 802 determines if the previously retrieved weather data from the control logic or method 700 is fair weather or sunny weather. A second control logic 804 connects the toy 10 to an Imp Cloud® or agent based database having songs related to fair or sunny weather. A third control logic 806 downloads and plays a song from the database. A fourth control logic 808 erases the song from the database. A fifth control logic 810 determines if the previously retrieved weather data from the control logic or method 700 is snow or cold weather if it was previously determined in the first control logic 802 that the weather data was not fair weather or sunny weather. A sixth control logic 812 connects the toy 10 to an Imp Cloud® or agent based database having songs related to snow or cold weather. A seventh control logic 814 downloads and plays a song from the database. An eighth control logic 816 erases the song from the database. A ninth control logic 818 determines if the previously retrieved weather data from the control logic or method 700 is rain if it was previously determined in the fifth control logic 810 that the weather data was not snow or cold weather. A tenth control logic 820 connects the toy 10 to an Imp Cloud® or agent based database having songs related to rain. A eleventh control logic 824 downloads and plays a song from the database. A twelfth control logic 826 erases the song from the database. A thirteenth control logic 828 connects the toy 10 to an Imp Cloud® or agent based database having songs related to cloudy weather. A fourteenth control logic 830 downloads and plays a song from the database. A fifteenth control logic 832 erases the song from the database.

Figure 11:
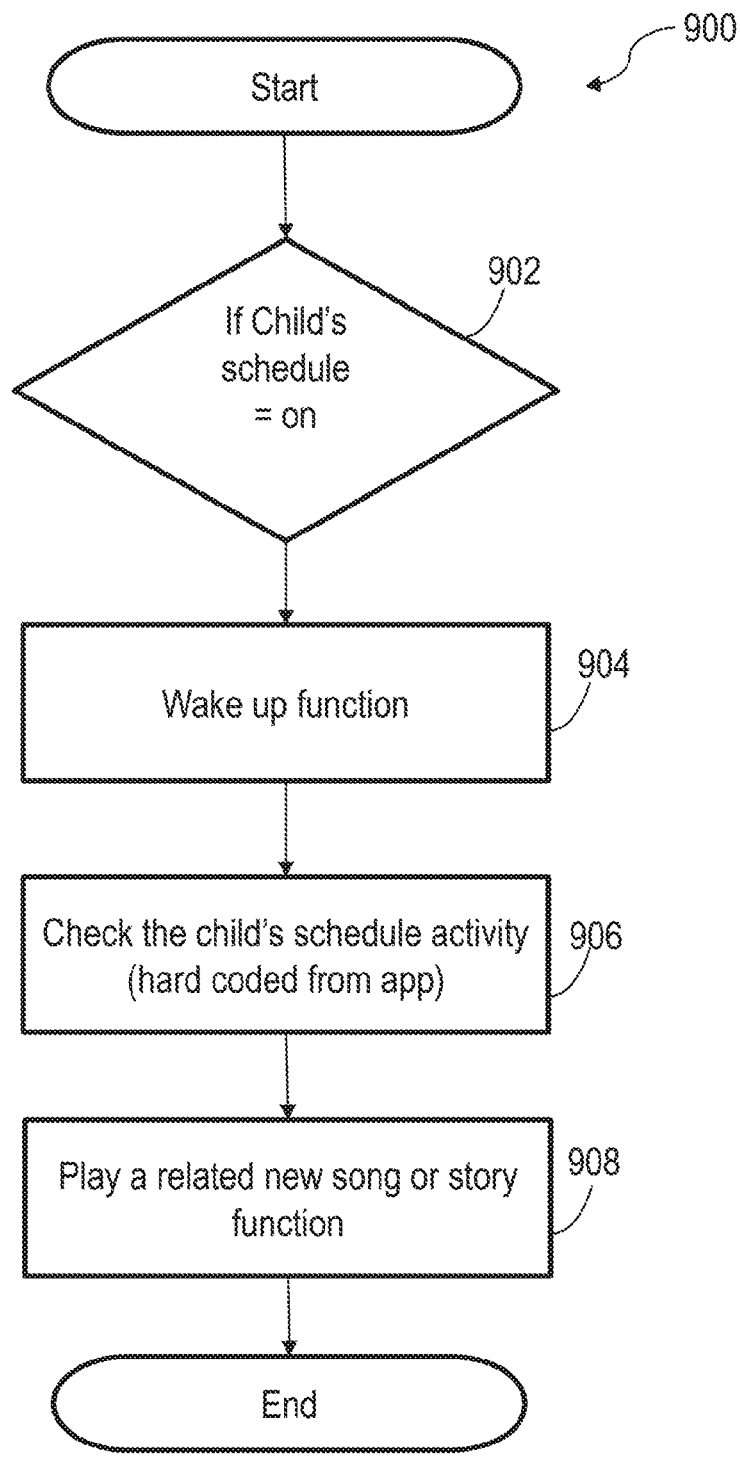
FIG. 11 is a flowchart of a method or control logic executed by an interactive toy according to the present disclosure.

Yet another exemplary control logic or method 900 is shown in flowchart form in FIG. 11 and is implemented in software program code that is executable by the CPU 26 executes a "Wakeup Toy" use case in a contextual schedule or calendar and includes a first control logic 902 determines if the users schedule is active or live. A second control logic 904 executes the "Wakeup Toy" use case as described below if the user's schedule is active. A third control logic 906 retrieves scheduling data which was previously entered into the application. A fourth control logic 908 selects, downloads, and plays a song or a story relating to the retrieved scheduling data.

Figure 12A:
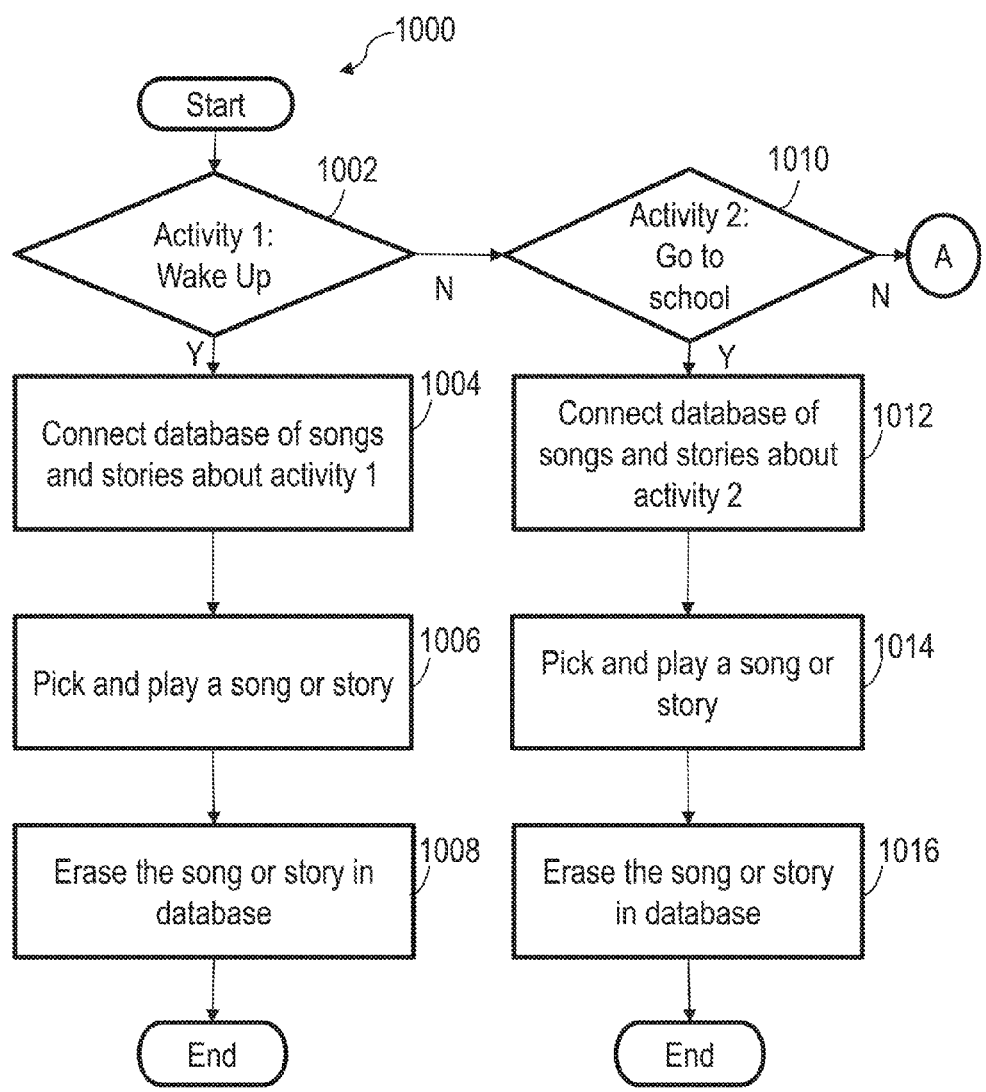
FIG. 12A is a flowchart of a method or control logic executed by an interactive toy according to the present disclosure.
Figure 12B:
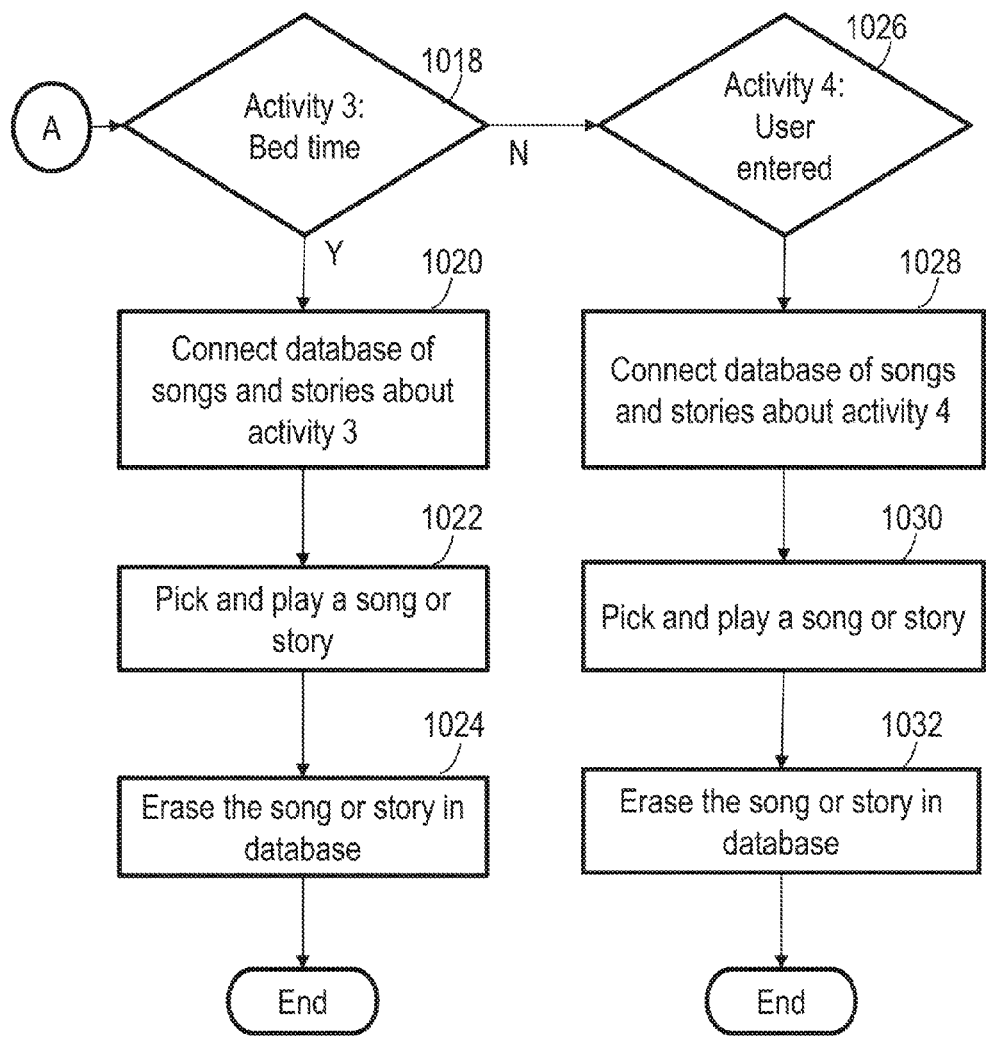
FIG. 12B is a flowchart of a method or control logic executed by an interactive toy according to the present disclosure.

Yet another exemplary control logic or method 1000 is shown in flowchart form in FIGS. 12A and 12B and is implemented in software program code that is executable by the CPU 26 for executing a schedule or activity contextual song and story and includes a first control logic 1002 determines if the previously retrieved scheduling data from the control logic or method 900 is a waking up activity. A second control logic 1004 connects the toy 10 to an Imp Cloud® or agent based database having songs related to the waking up activity. A third control logic 1006 selects, downloads, and plays a song or story from the database. A fourth control logic 1008 erases the song or story from the database. A fifth control logic 1010 determines if the previously retrieved scheduling data from the control logic or method 900 is a go to school activity if it was previously determined in the first control logic 1002 that the scheduling data was not a wake up activity. A sixth control logic 1012 connects the toy 10 to an Imp Cloud® or agent based database having songs related to the going to school activity. A seventh control logic 1014 selects, downloads, and plays a song or story from the database. An eighth control logic 1016 erases the song or story from the database. A ninth control logic 1018 determines if the previously retrieved scheduling data from the control logic or method 900 is a bed time activity if it was previously determined in the fifth control logic 1010 that the scheduling data was not a going to school activity. A tenth control logic 1020 connects the toy 10 to an Imp Cloud® or agent based database having songs related to a bed time activity. A eleventh control logic 1022 selects, downloads, and plays a song or story from the database. A twelfth control logic 1024 erases the song or story from the database. A thirteenth control logic 1026 determines if the previously retrieved scheduling data from the control logic or method 900 is a user entered activity if it was previously determined in the ninth control logic 1018 that the scheduling data was not a bed time activity. A fourteenth control logic 1028 connects the toy 10 to an Imp Cloud® or agent based database having songs related to the user entered activity. A fifteenth control logic 1030 selects, downloads, and plays a song or story from the database. A sixteenth control logic 1032 erases the song or story from the database.

In another example of the present invention, the toy 10, agent and Toymail application include a plurality of use cases or executable methods. One such use case, the "Install Batteries" use case, is executed when new batteries are installed or recharged and includes turning the toy 10 on and connecting to a Wifi network when the batteries are installed or charged and indicating to the user that the toy 10 is connected to a Wifi network via a LED indicator. Next, the toy 10 signals to the user that the toy 10 is awaiting user input. The toy 10 then awaits user input. They toy 10 indicates that the toy 10 is not linked or "Blinked Up" to a Toymail application on an iPhone®. The toy 10 then waits for a user to link the toy 10 with the Toymail application. If the toy fails to connect to a Wifi network, the toy 10 indicates so. The toy 10 updates the Electric Imp® operating system if required when connected to the Wifi network. Next, the toy 10 attempts to connect to the Wifi network through a new router when the batteries are removed and installed again.

Yet another exemplary use case or executable method implemented in software program code that is executable by the CPU 26 when batteries are installed or recharged and the toy 10 is in a deep sleep mode. The "Wakeup Toy" use case includes a main scenario and several alternate scenarios. The main scenario includes connecting the toy 10 to the Imp Cloud® via a Wifi network when the user has pressed one of the play or record buttons 36A, 36B. The toy 10 then checks the battery charge level. Next, the toy 10 checks if there is a reply data message to upload to the Imp Cloud. After waiting for user input, the toy 10 requests the agent to check for new messages, waits for one minute for input and then goes back to sleep. A first alternate scenario occurs when the Imp Cloud® is not available. The toy 10 attempts to connect for up to one minute and then goes back into deep sleep mode for 9 minutes if the toy 10 fails to connect to a Wifi network. A second alternate scenario plays the last downloaded message if the toy 10 was awoken by a user input by pressing the play or record buttons 36A, 36B. A third alternate scenario indicates to the user that the battery has a low charge. A fourth alternate scenario sends the toy 10 back into deep sleep mode if the battery has a critically low charge. A fifth alternate scenario notifies the agent that there is a voice data message to upload to the Imp Cloud®. The toy 10 then uploads the message. A sixth alternate scenario detects that there is a new message to be downloaded from the Imp Cloud® and that the current downloaded message has been played at least once. The toy 10 then downloads the new message.

Yet another exemplary use case or executable method implemented in software program code that is executable by the CPU 26 when the toy 10 is in an awake mode. The "Goto Sleep" use case includes a main scenario. The main scenario begins with the toy 10 disabling the microphone. Next, the toy 10 puts the flash memory into sleep mode. The toy then disables the speak and configures the Electric Imp® to wake up if a button 36 is pushed. Finally, the toy 10 goes into deep sleep mode for seven minutes.

Yet another exemplary use case or executable method implemented in software program code that is executable by the CPU 26 when the toy 10 is in an awake mode. The "Download Message" use case includes a main scenario and an alternate scenario. The agent gets a message queue status from the backend server which indicates at least one message is available to download. The agent notifies the toy 10 that there is a message for downloading. The toy 10 erases any existing message in the flash memory. The toy 10 indicates to the user that erasing of the existing message is progressing. A sound file containing the voice data message is sent from the backend server, buffered on the agent, and transferred in chucks of data to the toy 10 which stores the message in the flash memory. The toy 10 indicates to the user that downloading of the message is progressing. The toy 10 then indicates to the user that a new message is available. The toy 10 waits one minute for the user to press the play button 36B. The toy 10 continues the "Goto Sleep" use case if the user does not press the play button. A first alternate scenario occurs when the flash memory already contains a message that has not been played back by the user. The sound file then remains on the backend server until flash memory space is available on the toy 10.

Yet another exemplary use case or executable method implemented in software program code that is executable by the CPU 26 when the toy 10 is in an awake mode. The "Play Message" use case includes a main scenario and two alternate scenarios. The main scenario begins when the play button has been pressed by the user. The downloaded message is played by the toy 10. The toy 10 then prompts the user to reply to the toy 10. The user presses the record button and the toy proceeds to a "Record Reply Message" use case described below. A first alternate scenario occurs when the user does not press the record button within five seconds. The toy 10 responds with indicating that the reply has been cancelled and proceeds to a "Wait Input" use case described below.

Yet another exemplary use case or executable method implemented in software program code that is executable by the CPU 26 when the toy 10 is in an awake mode. The "Wait Input" use case includes a main scenario and four alternate scenarios. The main scenario begins as the toy first requests the agent to check for new messages. The toy 10 waits for one minute for input and going back to sleep mode. In first alternate scenario the toy checks for a viable Wifi connection and goes bake to sleep mode if there is not a connection. A second alternate scenario plays the latest downloaded message when the user presses the play button 36A. A third alternate scenario downloads the next message from the Imp Cloud® when the previously downloaded message has been played at least once. A fourth alternate scenario allows the toy 10 to ignore the record button input when the record button 36B is pressed by the user.

Yet another exemplary use case or executable method implemented in software program code that is executable by the CPU 26 when the toy 10 is in an awake mode. The "Record Reply Message" use case includes a main scenario and an alternate scenario. The main scenario begins when a message has been downloaded from the agent and played by the toy 10. The flash memory is erased with the toy 10 providing an indicator of the erasing progress and when the erasing is complete. The user speaks into the microphone 40 as the toy 10 records the message for up to ten seconds. The toy 10 gives an indicator of the end of recording and plays back the recorded message. The messages is then uploaded to the agent. The alternate scenario occurs as the toy 10 ignores the input when the user presses buttons 36 while recording.

Yet another exemplary use case or executable method implemented in software program code that is executable by the CPU 26 when the toy 10 is in an awake mode. The "Upload Reply Message" use case includes a main scenario and three alternate scenarios. The main scenario begins when a message has been recorded to flash memory. The toy 10 indicates to the user that the message is about to be sent. The toy 10 waits five seconds for the record button 36B to be pressed. If the record button is not pressed, the toy 10 indicates to the agent that there is a new message to upload and the new message is uploaded while the toy 10 indicates to the user that the uploading is occurring and that the upload is complete. The agent posts the message to a reply directory on the backend server. A first alternate scenario occurs when the record button has been pressed prior to sending the message. The toy 10 indicates to the user that the uploading has been cancelled. A second alternate scenario occurs when the agent is not available due to a connectivity problem and the toy goes to the "Wait Input" use case. A third alternate scenario occurs when the backend server is not available. The agent will time-out and the reply message will be lost.

The toy 10 is capable of a plurality of embedded sounds that are used as indicators to the user that the toy 10 is awaiting input, taking time to accomplish a task, or entering into a mode. The sounds include a regular alert sound, a Toymail alert sound for the morning, a Toymail alert sound for the afternoon and evening, a beep played during lengthy operations, a double beep played at the end of operations, a first message left sound when the record button is pressed and there are no massages to play, a first message right sound when the play button is pressed and there are no messages available to play, a on instructions sound played after the batteries have been installed, a low battery sound, a messages coming sound that states "Messages coming . . . just a minute", a press to reply sound that states "Press right button to reply", a recording sound that states "Recording . . . ", a sending sound stating "Sending . . . " a cancelled sound played when a reply message is lost, and a "All Gone" sound played after a reply has been uploaded to the agent.

The toy 10 is also capable of providing visual indicators using the LEDs. The LEDs can show different colors and can be pulsed at different speeds.

The description of the invention is merely exemplary in nature and variations that do not depart from the gist of the invention are intended to be within the scope of the invention. Such variations are not to be regarded as a departure from the spirit and scope of the invention.

What is claimed is:

1. An interactive toy, comprising:
    a body having an ornamental exterior and a perforated surface section;
    a central processing unit (CPU) disposed within the body, wherein the CPU includes an imbedded control logic configured to operate the interactive toy, wherein the imbedded control logic is configured to at least one of:
        transmit, to a cloud data storage device and in response to an absence of a receipt, within a specific duration of time, of a signal to record a first message, a notification about a second message to be uploaded;
        transmit, to the cloud data storage device and in response to the receipt, within the specific duration of time after a presentation of a third message, of the signal to record the first message, a notification about the first message to be uploaded;
        provide a first indication in response to a determination that a received message is from a specific source and provide a second indication in response to a determination that the received message is not from the specific source;
        provide an item of entertainment related to a current weather at a location of the interactive toy; or
        provide an item of entertainment related to a current activity of a user of the interactive toy;
    a wireless communication module in communication with the CPU, the wireless communication module being at least one of a satellite direct communication unit or a cellular communication unit having a subscriber identification module (SIM) card;
    a memory module in communication with the CPU;
    a battery module in communication with the CPU, the battery module configured to provide electrical power; and
    a plurality of input/output modules in communication with the CPU, the plurality of input/output modules configured to send and receive signals between the user of the interactive toy and the CPU.

2. The interactive toy of claim 1, wherein the wireless communication module further comprises at least one of a Wi-Fi™ connectivity communication unit or a Bluetooth® communication unit.

3. The interactive toy of claim 1, wherein the memory module is at least one of a chip-based memory module, a flash memory, a mechanical based memory module, or a hard drive.

4. The interactive toy of claim 1, wherein the battery module includes a battery monitor in communication with the CPU and is configured to receive at least one of a rechargeable battery or a one-time use battery.

5. The interactive toy of claim 1, wherein the plurality of input/output modules include at least one of an input button, an audio input module, an audio output module, a light emitting device, a vibration module, or a movement detection module.

6. The interactive toy of claim 5, wherein the input button is disposed on the body of the interactive toy and includes at least one of a play button or a record button.

7. The interactive toy of claim 6, wherein the audio input module includes a microphone and a first amplifier, and wherein the microphone is disposed on an inside of the body of the interactive toy and is proximate to the perforated surface section.

8. The interactive toy of claim 7, wherein the audio output module includes a speaker and a second amplifier, and wherein the speaker is disposed on the inside of the body of the interactive toy and is proximate to the perforated surface section.

9. The interactive toy of claim 8, wherein the ornamental exterior of the body includes a soft-touch surface and features of a character head having at least a pair of eyes, a nose, and a mouth.

10. The interactive toy of claim 9, wherein the light emitting device includes light emitting diodes (LEDs) disposed on the ornamental exterior of the body.

11. The interactive toy of claim 8, wherein the imbedded control logic of the CPU includes:
    a first control logic configured to play a downloaded audio message;
    a second control logic configured to provide a signal to the user to reply to the downloaded audio message;
    a third control logic configured to pause to allow the user time to press the record button;
    a fourth control logic configured to determine that the record button has been pressed;
    a fifth control logic configured to activate the audio input module to receive voice data from the user in response to the record button having been pressed;
    a sixth control logic configured to determine that the play button has been pressed and that the record button has not been pressed and configured to return control to the first control logic in response to a determination that the play button has been pressed;
    a seventh control logic configured to provide a cancellation signal to the user via the audio output module in response to a determination that the play button has not been pressed; and
    an eighth control logic configured to pause the CPU to wait for an input from the user.

12. The interactive toy of claim 8, wherein the imbedded control logic of the CPU includes:
    a first control logic configured to erase any recorded voice data from the memory module;
    a second control logic configured to provide a signal to the user to begin recording an audio message;
    a third control logic configured to record into the memory module the audio message;
    a fourth control logic configured to wait for additional audio data for the audio message;
    a fifth control logic configured to provide a signal to the user that a recordation of the audio data message has ceased;
    a sixth control logic configured to play back the audio message; and a seventh control logic configured to upload the audio message to an Internet or a cloud server for retrieval by a second user.

13. An interactive toy, comprising:
a body having an ornamental exterior and a perforated surface section;
a central processing unit (CPU) disposed within the body, wherein the CPU includes an imbedded control logic configured to operate the interactive toy, wherein the imbedded control logic is configured to at least one of:
transmit, to a cloud data storage device and in response to an absence of a receipt, within a specific duration of time, of a signal to record a first message, a notification about a second message to be uploaded;
transmit, to the cloud data storage device and in response to the receipt, within the specific duration of time after a presentation of a third message, of the signal to record the first message, a notification about the first message to be uploaded;
provide a first indication in response to a determination that a received message is from a specific source and provide a second indication in response to a determination that the received message is not from the specific source;
provide an item of entertainment related to a current weather at a location of the interactive toy; or
provide an item of entertainment related to a current activity of a user of the interactive toy;
a wireless communication module in communication with the CPU, wherein the wireless communication module is at least one of a satellite direct communication unit or a cellular communication unit having a subscriber identification module (SIM) card;
a memory module in communication with the CPU, wherein the memory module is at least one of a chip-based memory module, a flash memory, a mechanical based memory module, or a hard drive;
a battery module in communication with the CPU, the battery module configured to provide electrical power; and
a plurality of input/output modules in communication with the CPU, the plurality of input/output modules configured to send and receive signals between the user of the interactive toy and the CPU.

14. The interactive toy of claim 13, wherein the battery module includes a battery monitor in communication with the CPU and is configured to receive at least one of a rechargeable battery or a one-time use battery.

15. The interactive toy of claim 13, wherein the plurality of input/output modules include at least one of a play button and disposed on the body of the interactive toy, a record button disposed on the body of the interactive toy, a microphone disposed on an inside of the body of the interactive toy and proximate to the perforated surface section, a speaker disposed on the inside of the body of the interactive toy and proximate to the perforated surface section, a light emitting device, a vibration module, or a movement detection module.

16. The interactive toy of claim 15, wherein the ornamental exterior of the body includes a soft-touch surface and features of a character head having at least a pair of eyes, a nose, and a mouth.

17. The interactive toy of claim 16, wherein the light emitting device includes light emitting diodes (LEDs) disposed on the ornamental exterior of the body.

18. The interactive toy of claim 13, wherein the imbedded control logic of the CPU includes:
a first control logic configured to play a downloaded audio message;
a second control logic configured to provide a signal to the user to reply to the downloaded audio message;
a third control logic configured to pause to allow the user time to press the record button;
a fourth control logic configured to determine that the record button has been pressed;
a fifth control logic configured to activate the audio input module to receive voice data from the user in response to the record button having been pressed;
a sixth control logic configured to determine that if the play button has been pressed and that the record button has not been pressed and configured to return control to the first control logic in response to a determination that the play button has been pressed;
a seventh control logic configured to provide a cancellation signal to the user via the audio output module in response to a determination that the play button has not been pressed; and
an eighth control logic configured to pause the CPU to wait for an input from the user.

\* \* \* \* \*